(12) United States Patent
Kamijoh et al.

(10) Patent No.: US 11,544,466 B2
(45) Date of Patent: Jan. 3, 2023

(54) OPTIMIZED DOCUMENT SCORE SYSTEM USING SENTENCE STRUCTURE ANALYSIS FUNCTION

(71) Applicant: INTERNATIONAL BUSINESS MACHINES CORPORATION, Armonk, NY (US)

(72) Inventors: Kohichi Kamijoh, Tokyo (JP); Miki Ishikawa, Tokyo (JP); Sachiko Yoshihama, Kanagawa-ken (JP); Issei Yoshida, Tokyo (JP); Yohei Ikawa, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 318 days.

(21) Appl. No.: 16/806,340

(22) Filed: Mar. 2, 2020

(65) Prior Publication Data

US 2021/0271821 A1 Sep. 2, 2021

(51) Int. Cl.
*G06F 40/30* (2020.01)
*G06F 40/253* (2020.01)
(Continued)

(52) U.S. Cl.
CPC ............ *G06F 40/30* (2020.01); *G06F 40/166* (2020.01); *G06F 40/253* (2020.01); *G06N 5/04* (2013.01); *G06N 20/00* (2019.01)

(58) Field of Classification Search
CPC ....................................................... G06F 40/30
See application file for complete search history.

(56) References Cited

U.S. PATENT DOCUMENTS 8,200,477 B2 * 6/2012 Yi .................. G06F 40/242
707/939
9,164,979 B1 * 10/2015 Dubey ................ H04H 60/46
(Continued)

FOREIGN PATENT DOCUMENTS

WO 2019023893 A 2/2019

OTHER PUBLICATIONS

Lippi, Marco, and Paolo Torroni. "Argument mining from speech: Detecting claims in political debates." Proceedings of the AAAI Conference on Artificial Intelligence. vol. 30. No. 1. 2016. (Year: 2016).*

(Continued)

*Primary Examiner* — Jialong He
(74) *Attorney, Agent, or Firm* — Tutunjian & Bitetto, P.C.; Joseph Petrokaitis

(57) ABSTRACT

A method is provided for determining support of a hypothesis by opinion sentences. The method converts sentence structures in the opinion sentences using various sentence structure conversion methods to obtain converted opinion sentences. For each converted opinion sentence, the method calculates a difference between a proximity label value indicating proximity to the hypothesis and an intermediate score before and after a conversion, adopts the conversion responsive to a condition being met relative to the difference, and adopts the opinion sentence instead responsive to the condition being unmet. The method creates sub-opinions using the various methods applied to adopted conversions and opinion sentences, and obtains an intermediate score for each sub-opinion. The method represents an amount of support for the hypothesis by obtaining and displaying a final score for each adopted conversions and opinion sentences based on the intermediate scores for the sub-opinions and for adopted conversions and opinion sentences.

18 Claims, 7 Drawing Sheets

(51) Int. Cl.
*G06N 5/04* (2006.01)
*G06N 20/00* (2019.01)
*G06F 40/166* (2020.01)

(56) References Cited

U.S. PATENT DOCUMENTS

2015/0178360 A1* 6/2015 Chen .................. G06F 16/245
707/602
2018/0253420 A1 9/2018 Komachi et al.
2019/0294962 A1 9/2019 Vezer et al.
2019/0303435 A1 10/2019 Herr et al.
2019/0311641 A1* 10/2019 Plant ..................... G09B 5/06
2020/0160000 A1* 5/2020 Bai ..................... G06F 40/247
2021/0209493 A1* 7/2021 Ishikawa ............... G06F 40/20

OTHER PUBLICATIONS

Lavee, Tamar, et al. "Towards effective rebuttal: Listening comprehension using corpus-wide claim mining." arXiv preprint arXiv: 1907.11889 (2019). (Year: 2019).*

Mell, P. et al., "The NIST Definition of Cloud Computing," 2011, 7 pages.

Bar-Haim, R. et al., "Stance Classification of Context-Dependent Claims" Proceedings of the 15th Conference of the European Chapter of the Association for Computational Linguistics (Apr. 2017) pp. 251-261, vol. 1.

* cited by examiner

OPTIMIZED DOCUMENT SCORE SYSTEM USING SENTENCE STRUCTURE ANALYSIS FUNCTION

BACKGROUND

The present invention generally relates to information processing, and more particularly to an optimized document score system using a sentence structure analysis function.

Many applications and fields benefit from knowing whether an opinion supports a given hypothesis. However, examination of such opinions to determine such support requires a significant amount of labor and time.

SUMMARY

According to aspects of the present invention, a computer-implemented method is provided for determining support of a hypothesis by opinion sentences. The method includes converting sentence structures in the opinion sentences using various sentence structure conversion methods to obtain converted opinion sentences. The method further includes, for each of the converted opinion sentences, calculating a value of a difference between a manually defined proximity label value indicating a proximity to the hypothesis and an intermediate score before and after a conversion by a processor-based text analysis engine. The method further includes, for each of the converted opinion sentences, adopting the conversion responsive to a pre-defined condition being met relative to the difference, and adopting the opinion sentence corresponding thereto instead of the conversion responsive to the pre-defined condition being unmet. The method also includes creating sub-opinions using at least one of the various sentence structure conversion methods applied to adopted ones of conversions and the opinion sentences. The method further includes obtaining an intermediate score for each of the sub-opinions by inputting the sub-opinions to the processor-based text analysis engine. The method additionally includes representing an amount of support for the hypothesis by obtaining and displaying a final score for each of the adopted ones of the conversions and the opinion sentences based on the intermediate scores for the sub-opinions and for the adopted ones of the conversions and the opinion sentences.

According to other aspects of the present invention, a computer program product is provided for determining support of a hypothesis by opinion sentences. The computer program product includes a non-transitory computer readable storage medium having program instructions embodied therewith. The program instructions are executable by a computer to cause the computer to perform a method. The method includes converting sentence structures in the opinion sentences using various sentence structure conversion methods to obtain converted opinion sentences. The method further includes, for each of the converted opinion sentences, calculating a value of a difference between a manually defined proximity label value indicating a proximity to the hypothesis and an intermediate score before and after a conversion by a processor-based text analysis engine. The method further includes, for each of the converted opinion sentences, adopting the conversion responsive to a pre-defined condition being met relative to the difference, and adopting the opinion sentence corresponding thereto instead of the conversion responsive to the pre-defined condition being unmet. The method also includes creating sub-opinions using at least one of the various sentence structure conversion methods applied to adopted ones of conversions and the opinion sentences, and obtaining an intermediate score for each of the sub-opinions by inputting the sub-opinions to the processor-based text analysis engine. The method additionally includes representing an amount of support for the hypothesis by obtaining and displaying a final score for each of the adopted ones of the conversions and the opinion sentences based on the intermediate scores for the sub-opinions and for the adopted ones of the conversions and the opinion sentences.

According to yet other aspects of the present invention, a computer processing system is provided for determining support of a hypothesis by opinion sentences. The computer processing system includes a memory device including program code stored thereon. The computer processing system further includes a hardware processor, operatively coupled to the memory device, and configured to run the program code stored on the memory device to convert sentence structures in the opinion sentences using various sentence structure conversion methods to obtain converted opinion sentences. The hardware processor further runs the program code to, for each of the converted opinion sentences, calculate a value of a difference between a manually defined proximity label value indicating a proximity to the hypothesis and an intermediate score before and after a conversion by a processor-based text analysis engine. The method further includes, for each of the converted opinion sentences, adopt the conversion responsive to a pre-defined condition being met relative to the difference, and adopt the opinion sentence corresponding thereto instead of the conversion responsive to the pre-defined condition being unmet. The hardware processor also runs the program code to create sub-opinions using at least one of the various sentence structure conversion methods applied to adopted ones of conversions and the opinion sentences, and obtaining an intermediate score for each of the sub-opinions by inputting the sub-opinions to the processor-based text analysis engine. The hardware processor additionally runs the program code to represent an amount of support for the hypothesis by obtaining and displaying a final score for each of the adopted ones of the conversions and the opinion sentences based on the intermediate scores for the sub-opinions and for the adopted ones of the conversions and the opinion sentences.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
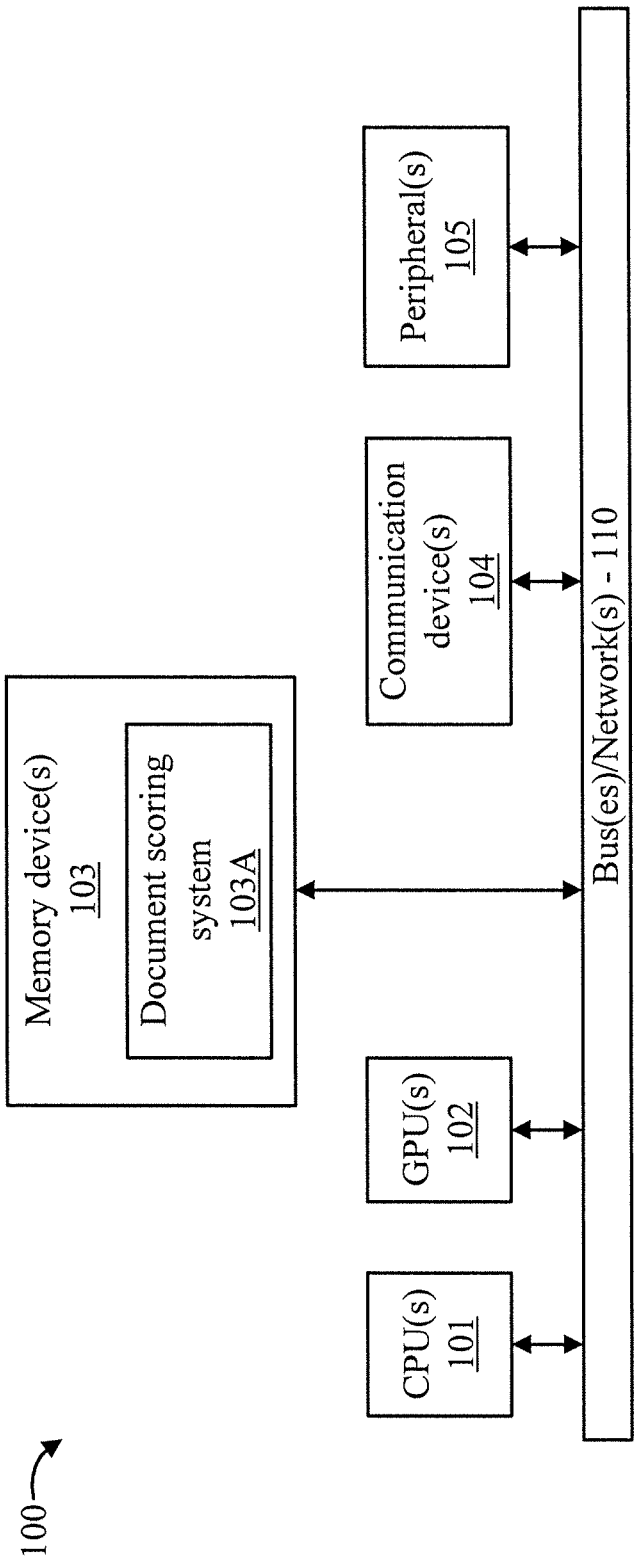
FIG. 1 is a block diagram showing an exemplary processing system, in accordance with an embodiment of the present invention.

Embodiments of the present invention are directed to an optimized document score system using a sentence structure analysis function.

Embodiments of the present invention relate to a system and method that output the score of the similarity between a hypothesis and an opinion, using existing text analysis engine, e.g., IBM debater Pro/Con API (hereafter, debater).

An existing text analysis engine, being input a hypothesis and an opinion, outputs the score, i.e., similarity between these two sentences between the range of −1 and 1, but its score is often poor, because it may be trained by corpus that are not related to the hypothesis and the opinion just inputted.

Therefore, embodiments provide a system and method that can output the score which is more accurate than the existing text analysis engine. To do that, using opinions relative to a hypothesis, the similarity between the hypothesis and each opinion is manually labeled between −1 (far) and 1 (close).

A goal is to make a system/method that can output a score close to the manually labelled label, since we now believe that the label is the answer. To do that, several conversions to the opinion are performed such as, e.g., deleting the sentence portion which is not the core of the sentence, splitting the opinion into two or more sentence, and so on. Then, we calculate a difference, e.g., the sum of the absolute value, between the label and the score before and after conversion, respectively. And for conversions which makes the sum smaller than original, we adopt them, since the smaller sum means it is close to the label.

In an embodiment, the present invention optimizes a pro/con score by rewriting opinions. In an embodiment, the present invention analyzes the structure of an opinion sentence (hereafter, opinion) and replaces the opinion so that parts relevant to the nature of the opinion are emphasized (delete, replace, split of the parts of the opinion, and their combinations). If the score improves after conversion of the opinion (the difference between the label value and the score gets smaller), then the conversion is adopted.

For example, in an embodiment, if the score improves by deleting the parts not directly related to the core of the opinion (e.g., an adjective clause including a conjunction), adopt the score yielded by the opinion in which such parts are deleted. For example, consider the following: "A, while B, is C"→"A is C", "A, although B"→"A", "A, despite B"→"A".

In an embodiment, if the score improves by replacing the parts not directly related to the core of the opinion with others (e.g. noun phrase), adopt the score yielded by the opinion in which such parts are replaced. For example, consider the following: "A, B said(B is long)"→A, he(she) said.

In an embodiment, if there are parallel expressions, split them into two or more sub-opinions. For example, consider the following: "A, B1 or B2, C"→"A, B1, C" and "A, B2, C".

In an embodiment, for opinions including one or more of above (e.g., deletion, replacement, and division), combine these conversions and create multiple sub-claims. For example, consider the following: "A1 or A2, while B, is C, D said (D is long)"→"Ai, while B, is C, D said", "A1 or A2, is C, D said", "A1 or A2, while B, is C, he(she) said", "Ai is C, D said", "Ai, while B, is C, he(she) said", "A1 or A2 is C, he(she) said", "Ai is C, he(she) said", (i=1 or 2).

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention. In an embodiment, memory devices 103 include a document scoring system 103A that is configured to score opinion sentences relative to a hypothesis to be supported. The document scoring system 103A includes specially configured software that works in conjunction with at least one of the processing elements 101 and/or 103.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 6-7). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
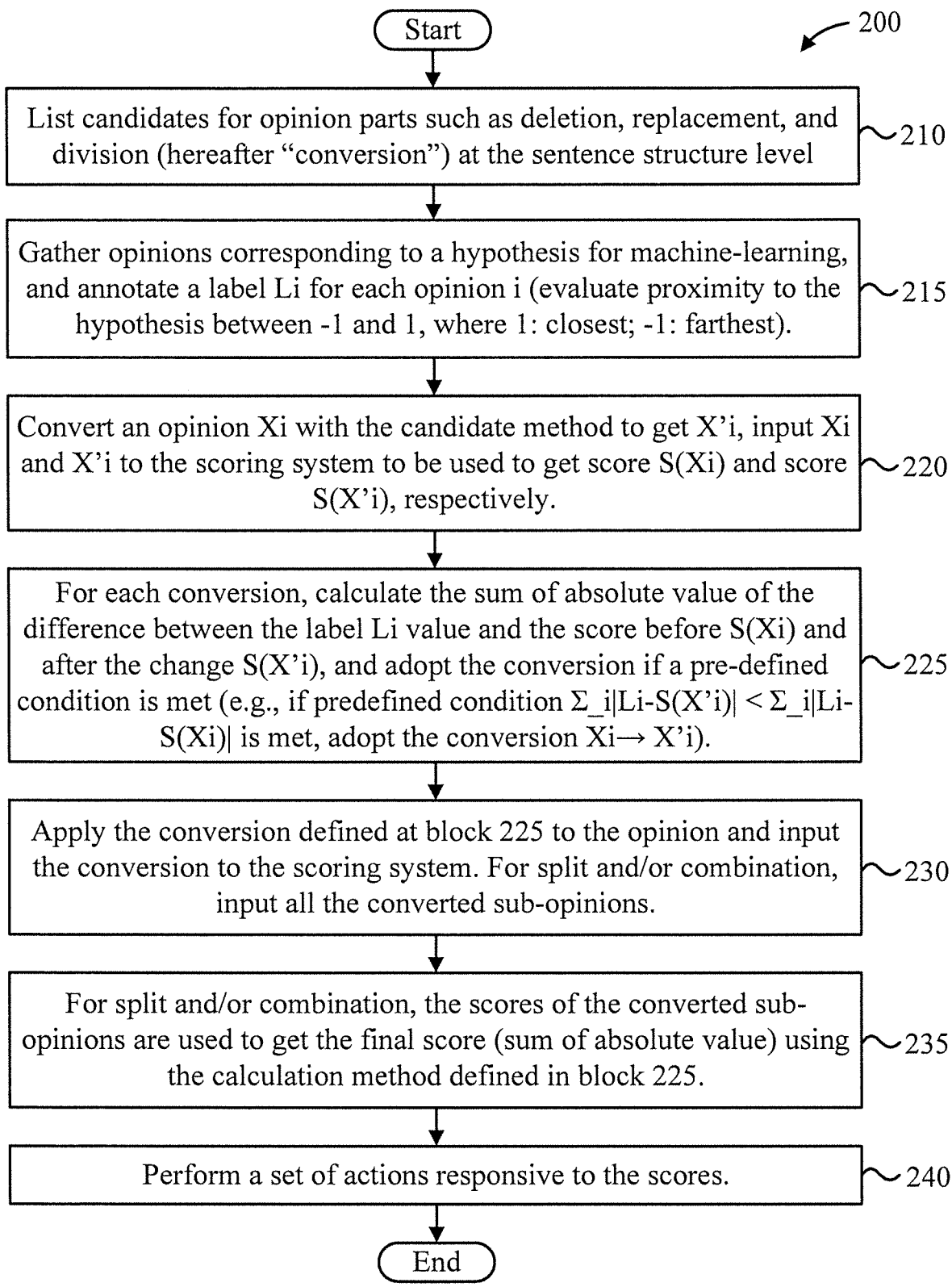
FIG. 2 is a flow diagram showing an exemplary method for optimizing a score by machine learning, pre-processing, and post-processing, in accordance with an embodiment of the present invention.

FIG. 2 is a flow diagram showing an exemplary method 200 for optimizing a score by machine learning, pre-processing, and post-processing, in accordance with an embodiment of the present invention. In method 200, blocks 210 and 215 correspond to preparation for machine-learning (premise), block 220 and 225 correspond to machine-learning (before runtime), block 230 corresponds to pre-process (runtime), and block 240 corresponds to post-Process (runtime).

At block 210, list candidates for opinion parts such as deletion, replacement, and division (hereafter "conversion") at the sentence structure level (e.g., "A, while B, is C→A is C").

At block 215, gather opinions corresponding to a hypothesis for machine-learning, and annotate a label Li for each opinion i (evaluate proximity to the hypothesis between −1 and 1, where 1: closest; −1: farthest). In an embodiment, the labelling is done manually. In another embodiment, the labeling is performed using an automated approach.

At block 220, convert an opinion Xi with the candidate method to get X'i, input Xi and X'i to the scoring system to be used (e.g., IBM debater Pro/Con API, hereinafter, debater) to get score S(Xi) and score S(X'i), respectively.

At block 225, for each conversion, calculate the sum of absolute value of the difference between the label Li value and the score before S(Xi) and after the change S(X'i), and adopt the conversion if a pre-defined condition is met (e.g., if predefined condition $\Sigma\_i|Li-S(X'i)|<\Sigma\_i|Li-S(Xi)|$ is met, adopt the conversion Xi→X'i).

At block 230, apply the conversion defined at block 225 to the opinion and input the conversion to the scoring system. For split and/or combination, input all the converted sub-opinions.

At block 235, for split and/or combination, the scores of the converted sub-opinions are used to get the final score (sum of absolute value) using the calculation method defined in block 225. The final score can be weighted if it involves a parallel expression. The weighting is performed so that the sum of difference between Li and the weighted value becomes minimum. For example, assuming $X'i=\Sigma j\ cj*xij$, where cj is the weighting coefficient and xij is the score of sub-opinion j for an opinion i, {cj} is defined so that $\Sigma\_ij(Li-X'i)^2$ becomes minimum by Least squares method or so. Weighting is performed for the cases where X'i is defined by using multiple sub-opinions such as parallel expression in which one opinion is divided into sub-opinions.

At block 240, perform a set of actions responsive to the scores.

A further description will now be given regarding block 210 of method 200 of FIG. 2, in accordance with an embodiment of the present invention. The opinion sentence structures of the learning data can be converted by any of (i) deleting a part lacking a direct relationship to a core of any of the opinion sentences, (ii) replacing a part lacking a direct relationship to the core of any of the opinion sentences, (iii) splitting a parallel expression into at least two sentences, and (iv) any combination of (i), (ii), and (iii). The term "lacking a directed relationship to a core of any of the opinion sentences" refers to the parts which do not change the core of the sentence even if they are dropped. The term "core of any of the opinion sentences" refers to the subjects of the opinion sentences. The term "parallel expression" refers to a sentence which includes one or more phases that list up two or more words in the phases.

An example of (i) deleting a part lacking a direct relationship to a core of any of the opinion sentences includes "A, while B, is C"→"A is C".

An example of (ii) replacing a part lacking a direct relationship to the core of any of the opinion sentences includes "A, B said (B is long)"→"A, he(she) said".

An example of (iii) splitting a parallel expression into at least two sentences includes "A, B1 or B2, C"-Split into "A,B1,C" and "A,B2,C".

Figure 3:
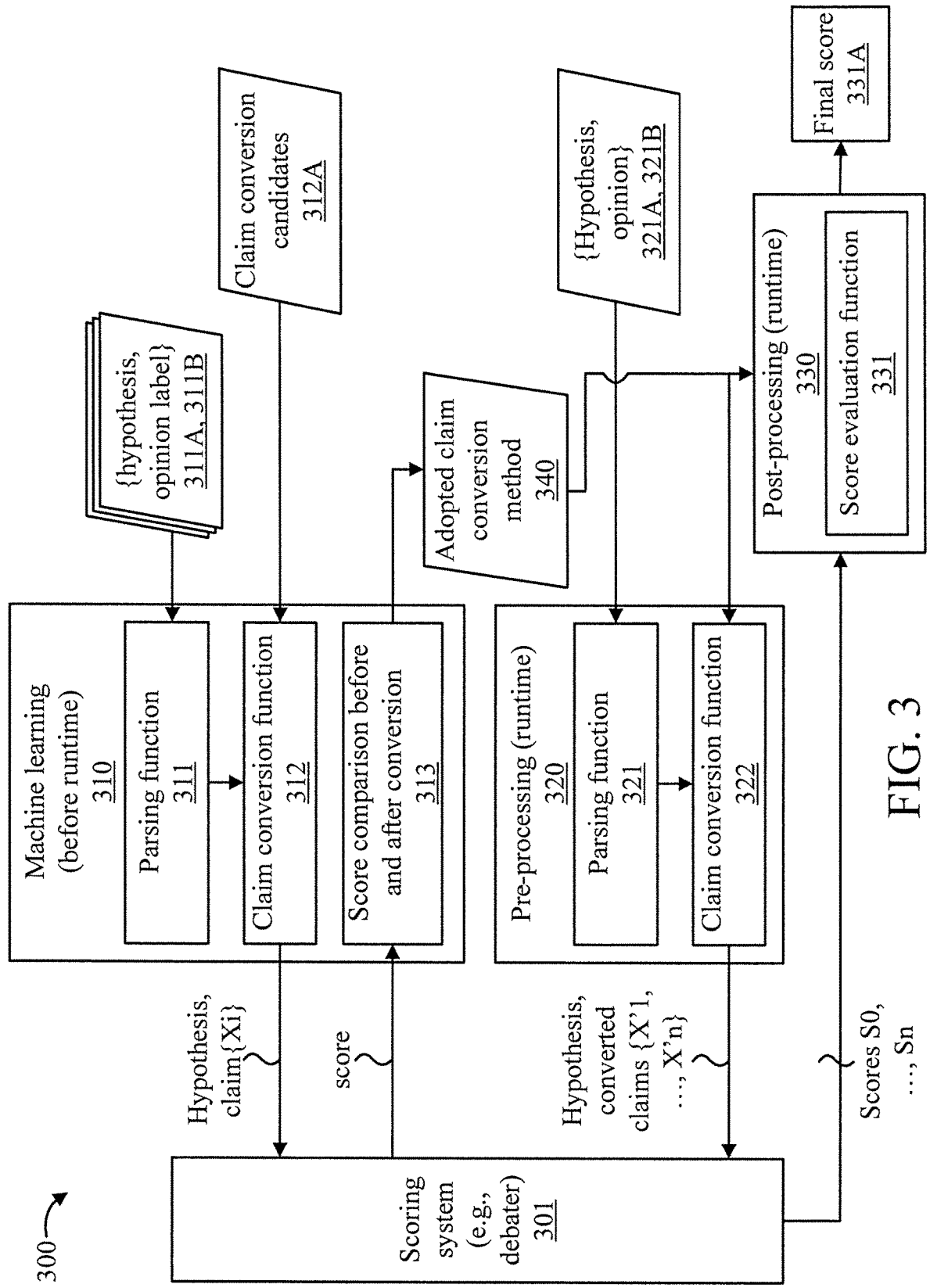
FIG. 3 is a block diagram showing an exemplary document scoring architecture, in accordance with an embodiment of the present invention.

FIG. 3 is a block diagram showing an exemplary document scoring architecture 300, in accordance with an embodiment of the present invention. Various aspects of architecture 300 will be described relative to the blocks of method 200.

The architecture 300 includes an existing scoring system (e.g., a debater) 301, a machine learning portion 310, a pre-processing portion 320, and a post-processing portion 330. The machine learning portion 310 corresponds to before runtime, while the pre-processing portion 320 and the post-processing portion 330 correspond to runtime.

The machine learning portion 310 includes a parsing function 311, an opinion conversion function 312, and a score comparison before and after conversion portion 313. The parsing function 311 performs block 215. The opinion conversion function 312 performs block 210. The score comparison before and after conversion portion 313 performs block 220. The parsing function 311 receives a hypothesis 311A and opinion labels as inputs 311B. The claim conversion function 312 receives claim conversion candidates 312A as inputs. The claim conversion function 312 outputs a hypothesis and opinion (Xi) to the debater 301. The score comparison before and after conversion portion 313 receives a score from the debater 302.

The pre-processing portion 320 includes a parsing function 321 and an opinion conversion function 322. The parsing function 321 and the opinion conversion function 322 perform block 230. The parsing function 321 receives a hypothesis 321A and an opinion 321B as (user) inputs. The opinion conversion function 322 outputs a hypothesis, and converted opinions (X'1, . . . , X'n) to the debater 301.

The post-processing portion 330 includes a score evaluation function 331. The score evaluation function performs block 340. The score evaluation function 331 provides the final score 331A as an output. The score evaluation function 331 receives scores S0, . . . , Sn from the debater 301. In the case of division or combination, the final score is calculated by the method of block 225 using S0, . . . Sn. If there is no division or combination, then output S0.

The architecture 300 further includes an adopted opinion conversion method 340. The adopted opinion conversion method 340 performs block 225. The adopted opinion conversion method 340 involves conjunctions, verbs and so forth to be deleted or replaced or split. The adopted opinion conversion method 340 involves a score calculation method for deletion, replacement, split and a combination thereof.

A further description will now be given regarding the score calculation process, in accordance with an embodiment of the present invention.

S(Xi) is the score of the opinion inputted to the existing scoring system (e.g., debater 301), and Li is the closeness between Xi and the hypothesis manually asserted in the range between −1 and 1 (1: closest, −1: farthest).

If the score improves (i.e., gets closer to the label value) by deleting the parts not directly related to the core of the opinion (e.g., an adjective clause including a conjunction), adopt the score yielded by the opinion in which the parts are deleted. As an example, consider the following: (Xi="A, while B, is C"→X'i="A is C"), (Xi="A, although B"→X'i="A"), (Xi="A, despite B"→X'i="A"), (Xi="if A,B"→X'i="B"). If, with multiple i's, $\Sigma\_i|Li-S(X'i)|<\Sigma\_i|Li-S(Xi)|$ is satisfied, adopt the score (S(X'i)) yielded by the opinion in which the parts (e.g. adjective clause) are deleted for the conjunction.

If the score improves by replacing the parts not directly related to the core of the opinion with others (e.g., noun phrase), adopt the score yielded by the opinion in which the parts are replaced. As an example, consider the following: Xi="A, B said(B is long)"→X'i="A, he(she) said". If, with multiple i's, $\Sigma\_i|Li-S(X'i)|<\Sigma\_i|Li-S(Xi)|$ is satisfied, adopt the score (S(X'i)) yielded by the opinion in which the parts (e.g. noun phase) are replaced for the verb (e.g., said).

If there are parallel expressions, split them into two or more sub-opinions, and adopt the method which yields best score→define best parallel sentence B1, B2, . . . , or Bn, calculated below, as P({Bj}). As an example, consider the following: Let Xi="A, B1, B2, . . . , or Bn, C" (including the case without C)→X'1i="A, B1, C", . . . , X'ni="A, Bn, C", $\Delta S1=\Sigma\_i|Li-maxabsavg_{pq}\{(S(X'ji)\}j|$, $\Delta S2=\Sigma\_i|Li-exc(\alpha)\{S(X'ji)\}j|$. If $\min\_k \Delta Sk<\Sigma\_i|Li-S(Xi)|$, adopt the method of $\Delta Sk$ that yields min_k. Here, $maxabavg_{pq}\{(S(X'ji)\}j$ is the average of {S (X'ji)}=S(X'1i), . . . , S(X'ni), whose absolute values from the p-th largest to the q-th largest, 1<=p<=q<=n, exc(α)(S(X'ji)) is the average of {S (X'ji)} (i fix) excluding those whose values are deviating from the average of {S (X'ji)} by its standard deviation*α, and α is a pre-defined positive value, e.g., 1.0. If min_kΔSk>=Σ_i|Li-S(Xi)|, then no split is performed.

For claims that include one or more of the above deletion, replacement, and division, create a combined sub-claims, calculate each score, and determine the final score. Gather opinions that include one or more of deletion, replacement, or split of the opinion, such as "A1 or A2, while B, is C, D said (D is long)". Classify them into seven groups including claims, i.e., (split), (delete), (replace), (delete, split), (replace, split), (delete, replace), and (delete, replace, split). The following is an example of including all three (delete, replace, split). (Calculate {cj} below for each of the remaining three groups above). As an example, consider the following: Xi="A1, . . . , or An, while B, is C, D said (D is long)". For this Xi, create sub-opinions with combination of each deletion, replacement, and division, get score of each of them, and determine the final score by weighting them. Calculate S0i=S(Xi) (as is), S1i=S(P({Ak}), while B, is C, D said), S2i=S(A1, . . . , or An, is C, D said), S3i= S(A1, . . . , or An, while B, is C, he(she) said), S4i=S(P{Ak} is C, D said), S5i=S(P{Ai}, while B, is C, he(she) said), S6i=S(A1, . . . , or An is C, he(she) said), S7i=S(P{Ai} is C, he(she) said), k=1, . . . , n. Calculate {cj}, cj>=0, which minimizes the total absolute value between the Label Li, T=Σi|Li-Σj cjSji|, by Gradient descent, steepest descent or the like. If Σi|Li-Σj cjSji|<Σi|Li-S0i| is satisfied, then use Σj cjSji as the final score. If not satisfied, then use S0i (as is) as the final score.

Figure 4:
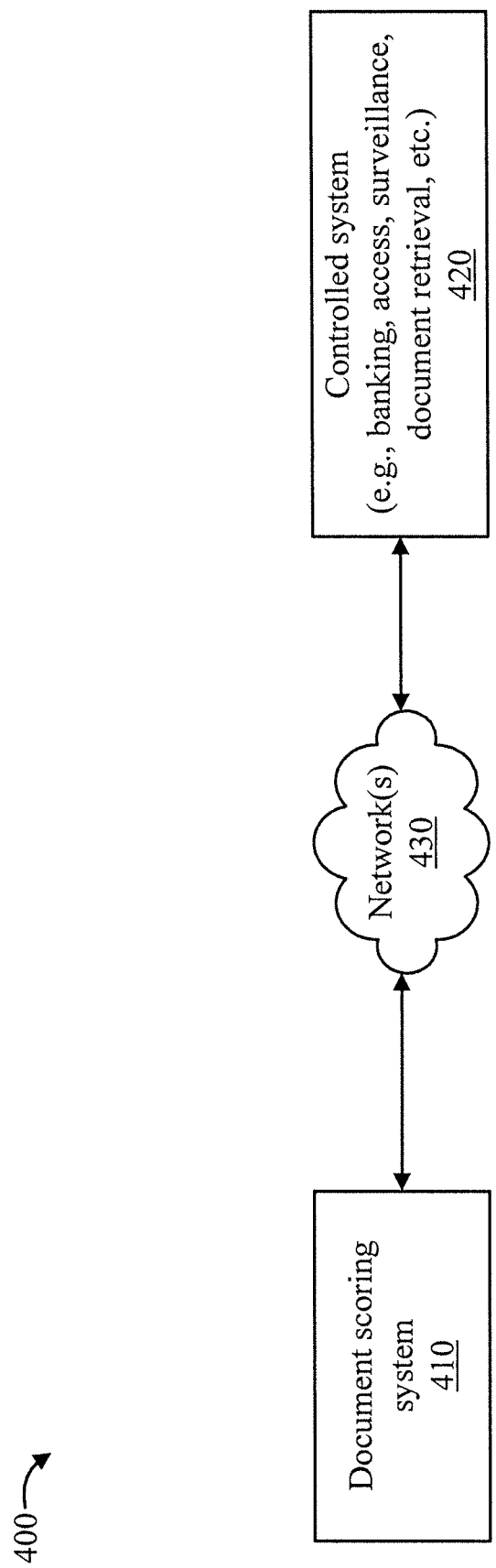
FIG. 4 is a block diagram showing an exemplary environment to which the present invention can be applied, in accordance with an embodiment of the present invention.

FIG. 4 is a block diagram showing an exemplary environment 400 to which the present invention can be applied, in accordance with an embodiment of the present invention.

The environment 400 includes a document scoring system 410 and a controlled system 420. The document scoring system 410 and the controlled system 420 are configured to enable communications therebetween. For example, transceivers and/or other types of communication devices including wireless, wired, and combinations thereof can be used. In an embodiment, communication between the document scoring system 410 and the controlled system 420 can be performed over one or more networks, collectively denoted by the figure reference numeral 430. The communication can include, but is not limited to, documents or other textual based inputs (e.g., time series data from a sensor), e.g., from the controlled system 420, and action initiation control signals from the document scoring system 410. The controlled system 420 can be any type of processor-based system such as, for example, but not limited to, a banking system, an access system, a surveillance system, a document retrieval system, and so forth. The invention can used to detect fraud in a banking system, detect fraudulent access in an access system, detect incorrect credentials in a surveillance system, retrieve a document(s) from a remote database that includes a converted opinion sentence(s) or sub-opinion(s) having the score above a threshold (such a document will be considered highly relevant (supportive) of the hypothesis), and so forth. To that end, state changes can be implemented such as lock to unlock, access to no access, and so forth. The preceding are merely exemplary. Further regarding the banking system as an example, the hypothesis can be that there are sufficient funds in an account to withdraw funds from, while the opinion statement can either support or not support the hypothesis based on a score. To that end, the present invention can readily work with complete sentences as well as sentence fragments that may be encountered in some environments. Taken further, the transaction can be blocked or performed based on the score, e.g., being below a threshold value. As another example, regarding the document retrieval system, a hypothesis can be supplied for which supporting documents, i.e., those including supporting opinion sentences or sub-opinions, can be retrieved.

In an embodiment, the document scoring system 210 can be implemented as a node in a cloud-computing arrangement. These and other configurations of the elements of environment 200 are readily determined by one of ordinary skill in the art given the teachings of the present invention provided herein, while maintaining the spirit of the present invention.

Figure 5:
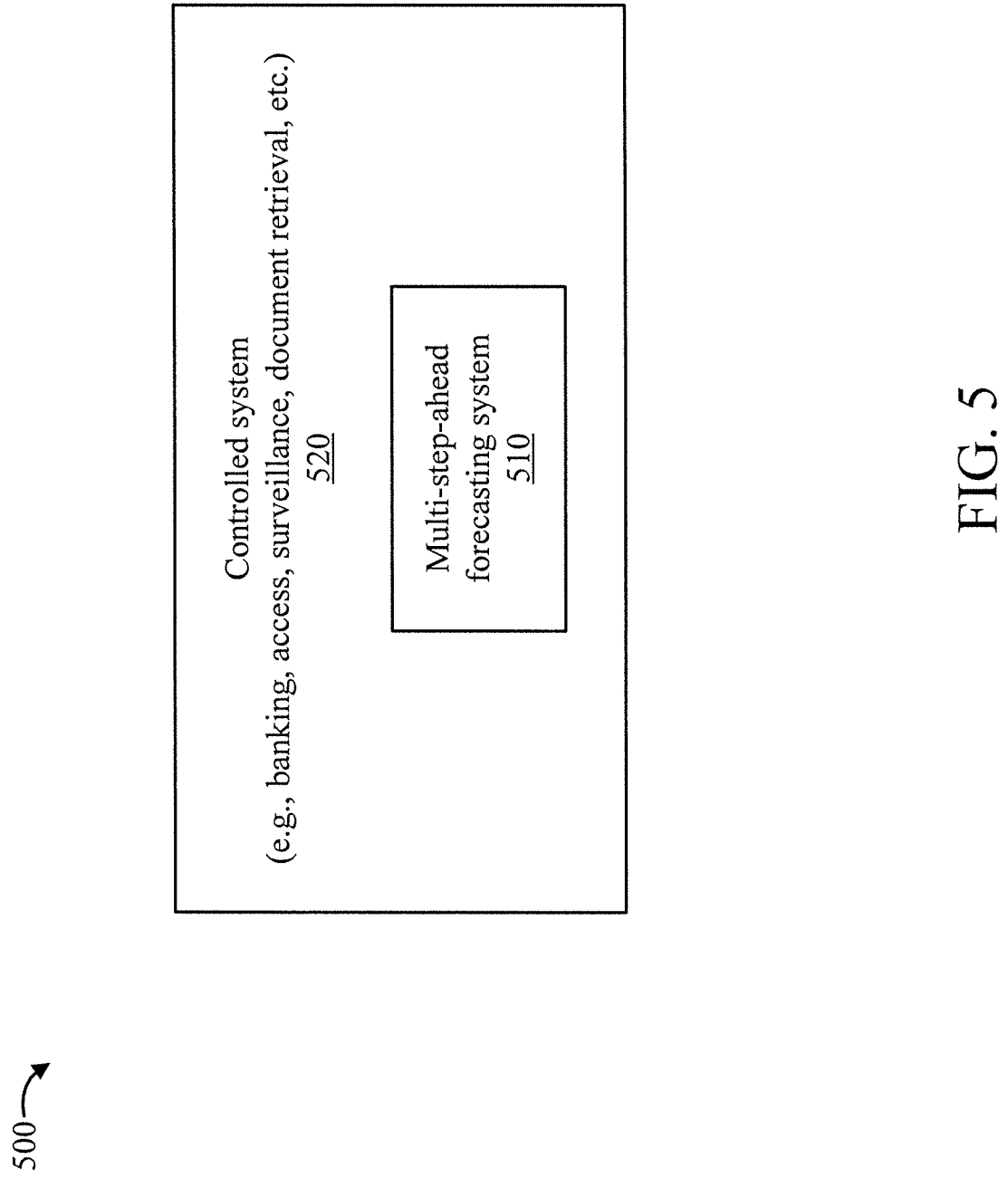
FIG. 5 is a block diagram showing another exemplary environment to which the present invention can be applied, in accordance with an embodiment of the present invention.

FIG. 5 is a block diagram showing another exemplary environment 500 to which the present invention can be applied, in accordance with an embodiment of the present invention.

The environment 500 includes a controlled system 520 that, in turn, includes a document scoring system 510. One or more communication buses and/or other devices can be used to facilitate inter-system, as well as intra-system, communication. The controlled system 520 can be any type of processor-based system such as, for example, but not limited to, a banking system, an access system, a surveillance system, a document retrieval system, and so forth.

Other than system 510 being included in system 520, operations of these elements in environments 400 and 500 are similar. Accordingly, elements 510 and 520 are not described in further detail relative to FIG. 5 for the sake of brevity, with the reader respectively directed to the descriptions of elements 410 and 420 relative to environment 400 of FIG. 4 given the common functions of these elements in the two environments 400 and 500.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
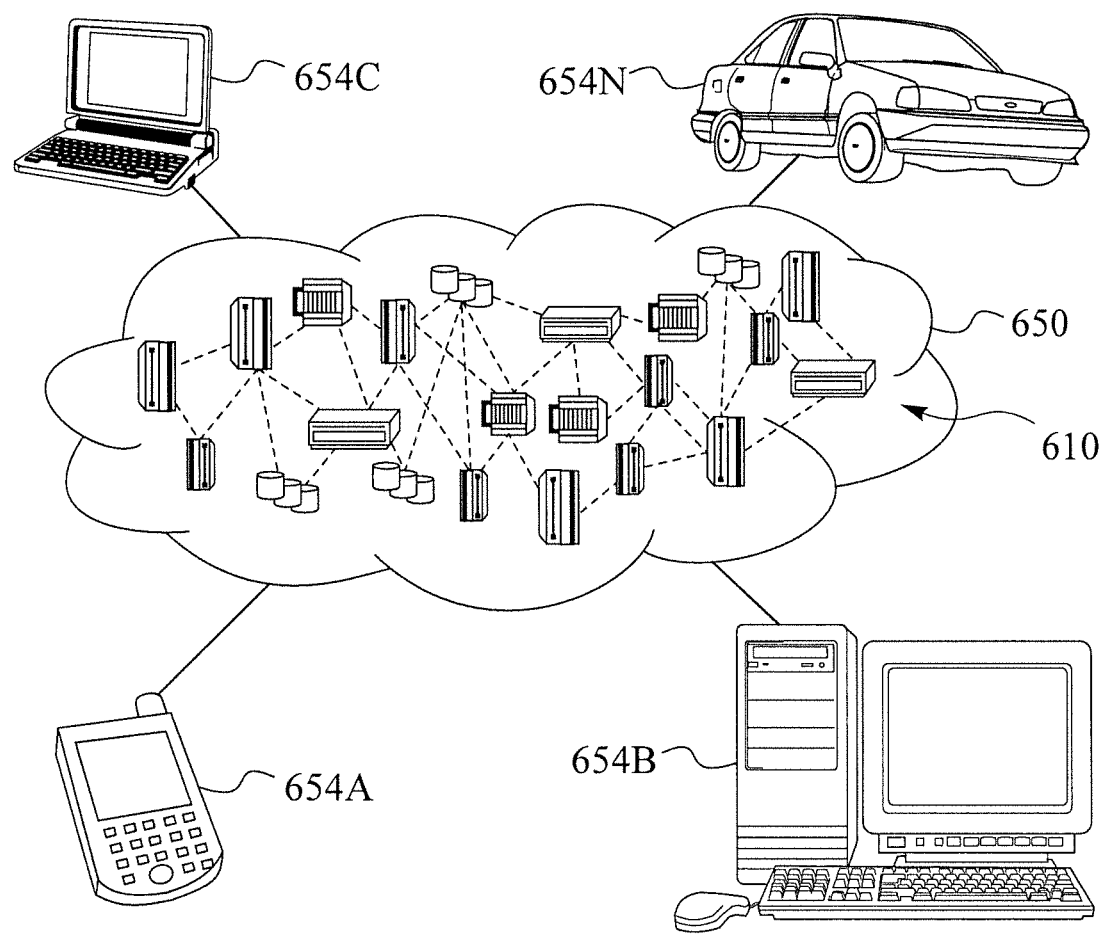
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
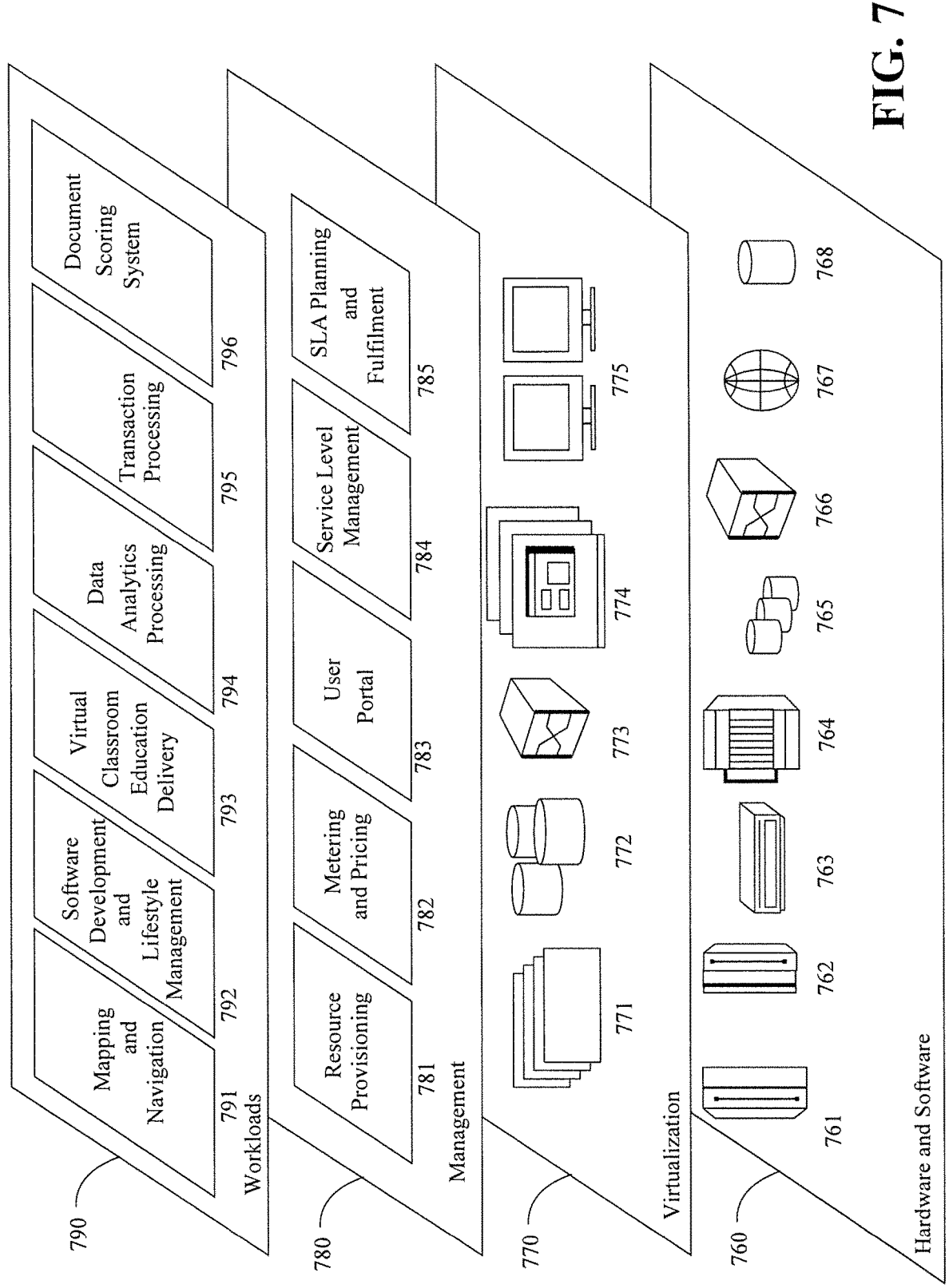
FIG. 7 is a block diagram showing a set of functional abstraction layers provided by a cloud computing environment, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and document scoring system 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for determining support of a hypothesis by opinion sentences, comprising:
    converting sentence structures in the opinion sentences using various sentence structure conversion methods to obtain converted opinion sentences;
    for each of the converted opinion sentences, calculating a value of a difference between a manually defined proximity label value indicating a proximity to the hypothesis and an intermediate score before and after a conversion by a processor-based text analysis engine;
    for each of the converted opinion sentences, adopting the conversion responsive to a pre-defined condition being met relative to the difference, and adopting the opinion sentence corresponding thereto instead of the conversion responsive to the pre-defined condition being unmet;
    creating sub-opinions using at least one of the various sentence structure conversion methods applied to adopted ones of conversions and the opinion sentences, and obtaining an intermediate score for each of the sub-opinions by inputting the sub-opinions to the processor-based text analysis engine;
    representing an amount of support for the hypothesis by obtaining and displaying a final score for each of the adopted ones of the conversions and the opinion sentences based on the intermediate scores for the sub-opinions and for the adopted ones of the conversions and the opinion sentences; and
    controlling a hardware-based object to transform the hardware-based object from a first state to a second state, responsive to the final score exceeding a threshold amount;
    wherein the intermediate score for the sub-opinions is calculated using the various sentence structure conversion methods used to obtain modified opinion sentences.

2. The computer-implemented method of claim 1, further comprising inputting the opinion sentences to a machine learning process that identifies the sentence structures in the opinion sentences.

3. The computer-implemented method of claim 1, wherein the manually defined proximity label value represents a proximity of a given one of the opinion sentences to the hypothesis and is constrained within a predetermined range, with an end of the range denoting a close proximity and another end of the range denoting a farther proximity.

4. The computer-implemented method of claim 1, wherein the processor-based text analysis engine comprises an artificial intelligence based system that calculates a similarity between the hypothesis and the opinion sentences.

5. The computer-implemented method of claim 1, wherein the various sentence structure conversion methods include splitting a parallel expression into at least two opinion sentences, and wherein the final score is weighted responsive to parallel expressions in any of the converted opinion sentences or sub-opinions.

6. The computer-implemented method of claim 5, wherein the various sentence structure conversion methods include other conversion methods wherein the intermediate score for a given one of the opinion sentences or sub-opinions is used as the final score in an absence of parallel expressions in any of the converted opinion sentences or sub-opinions.

7. The computer-implemented method of claim 1, wherein the pre-defined condition comprises that a sum of absolute values of the manually defined proximity label value and the intermediate score of the conversion is smaller than the sum of the absolute values of the manually defined proximity label value and the intermediate score of an original version of a given one of the opinion sentences.

8. The computer-implemented method of claim 1, wherein the various sentence structure conversion methods comprise deleting a part lacking a direct relationship to a core of any of the opinion sentences, replacing a part lacking a direct relationship to the core of any of the opinion sentences, splitting a parallel expression into the at least two sentences, or any combination of the deleting, replacing and or splitting steps.

9. The computer-implemented method of claim 8, wherein deleting the part lacking the direct relationship to the core of any of the opinion sentences comprises deleting an adjective clause including a conjunction.

10. The computer-implemented method of claim 8, wherein replacing the part lacking the direct relationship to the core of any of the opinion sentences comprises replacing a noun phrase.

11. The computer-implemented method of claim 8, wherein said calculating step comprises, for the parallel expression, adopting one of the at least two opinion sentences yielding a highest absolute value for the intermediate score.

12. The computer-implemented method of claim 1, wherein the various sentence structure conversion methods comprise deleting one or more parts of speech and replacing one or more parts of speech.

13. The computer-implemented method of claim 1, wherein said calculating step comprises, for any of the opinion sentences, including one or more of the various sentence structure conversion methods, creating combined sub-opinions and determining the intermediate score therefor.

14. A computer program product for determining support of a hypothesis by opinion sentences, the computer program product comprising a non-transitory computer readable storage medium having program instructions embodied therewith, the program instructions executable by a computer to cause the computer to perform a method comprising:
converting sentence structures in the opinion sentences using various sentence structure conversion methods to obtain converted opinion sentences;
for each of the converted opinion sentences, calculating a value of a difference between a manually defined proximity label value indicating a proximity to the hypothesis and an intermediate score before and after a conversion by a processor-based text analysis engine;
for each of the converted opinion sentences, adopting the conversion responsive to a pre-defined condition being met relative to the difference, and adopting the opinion sentence corresponding thereto instead of the conversion responsive to the pre-defined condition being unmet;
creating sub-opinions using at least one of the various sentence structure conversion methods applied to adopted ones of conversions and the opinion sentences, and obtaining an intermediate score for each of the sub-opinions by inputting the sub-opinions to the processor-based text analysis engine; and
representing an amount of support for the hypothesis by obtaining and displaying a final score for each of the adopted ones of the conversions and the opinion sentences based on the intermediate scores for the sub-opinions and for the adopted ones of the conversions and the opinion sentences; and
controlling a hardware-based object to transform the hardware-based object from a first state to a second state, responsive to the final score exceeding a threshold amount;
wherein the intermediate score for the sub-opinions is calculated using the various sentence structure conversion methods used to obtain modified opinion sentences.

15. The computer program product of claim 14, wherein the various sentence structure conversion methods comprise deleting a part lacking a direct relationship to a core of any of the opinion sentences, replacing a part lacking a direct relationship to the core of any of the opinion sentences, splitting a parallel expression into at least two sentences, or any combination of the deleting, replacing or splitting steps.

16. The computer program product of claim 15, wherein said calculating step comprises, for the parallel expression, adopting one of the at least two sentences yielding a highest value for the intermediate score.

17. The computer program product of claim 14, wherein the various sentence structure conversion methods comprise deleting one or more parts of speech and replacing one or more parts of speech.

18. A computer processing system for determining support of a hypothesis by opinion sentences, comprising:
a memory device including program code stored thereon;
a hardware processor, operatively coupled to the memory device, and configured to run the program code stored on the memory device to:
convert sentence structures in the opinion sentences using various sentence structure conversion methods to obtain converted opinion sentences;
for each of the converted opinion sentences, calculate a value of a difference between a manually defined proximity label value indicating a proximity to the hypothesis and an intermediate score before and after a conversion by a processor-based text analysis engine;
for each of the converted opinion sentences, adopt the conversion responsive to a pre-defined condition being met relative to the difference, and adopt the opinion sentence corresponding thereto instead of the conversion responsive to the pre-defined condition being unmet;

create sub-opinions using at least one of the various sentence structure conversion methods applied to adopted ones of conversions and the opinion sentences, and obtaining an intermediate score for each of the sub-opinions by inputting the sub-opinions to the processor-based text analysis engine;

represent an amount of support for the hypothesis by obtaining and displaying a final score for each of the adopted ones of the conversions and the opinion sentences based on the intermediate scores for the sub-opinions and for the adopted ones of the conversions and the opinion sentences; and control a hardware-based object to transform the hardware-based object from a first state to a second state, responsive to the final score exceeding a threshold amount, wherein the intermediate score for the sub-opinions is calculated using the various sentence structure conversion methods used to obtain modified opinion sentences.

\* \* \* \* \*